(12) United States Patent
Mio et al.

(10) Patent No.: US 10,606,503 B2
(45) Date of Patent: Mar. 31, 2020

(54) APPARATUS TO REDUCE A DATA-MIGRATION TIME FOR REARRANGING DATA BETWEEN STORAGE HIERARCHICAL LAYERS

(71) Applicant: FUJITSU LIMITED, Kawasaki-shi, Kanagawa (JP)

(72) Inventors: Kazutoshi Mio, Nagoya (JP); Tomoaki Abe, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/237,977

(22) Filed: Jan. 2, 2019

(65) Prior Publication Data

US 2019/0220214 A1    Jul. 18, 2019

(30) Foreign Application Priority Data

Jan. 17, 2018   (JP) ................................. 2018-005583

(51) Int. Cl.
| | |
|---|---|
| G06F 3/00 | (2006.01) |
| G06F 3/06 | (2006.01) |
| G06F 12/02 | (2006.01) |
| G06F 12/00 | (2006.01) |

(52) U.S. Cl.
CPC ............ *G06F 3/0647* (2013.01); *G06F 3/061* (2013.01); *G06F 3/0629* (2013.01); *G06F 3/0658* (2013.01); *G06F 3/0683* (2013.01); *G06F 12/00* (2013.01); *G06F 12/02* (2013.01)

(58) Field of Classification Search
None
See application file for complete search history.

(56) References Cited

U.S. PATENT DOCUMENTS

| | | |
|---|---|---|
| 2006/0047930 A1 | 3/2006 | Takahashi et al. |
| 2014/0297983 A1 | 10/2014 | Takeda et al. |
| 2015/0081964 A1 | 3/2015 | Kihara et al. |

FOREIGN PATENT DOCUMENTS

| | | |
|---|---|---|
| JP | 2008-047156 | 2/2008 |
| JP | 2014-199596 | 10/2014 |
| WO | 2013/164878 | 11/2013 |

*Primary Examiner* — Midys Rojas
(74) *Attorney, Agent, or Firm* — Fujitsu Patent Center

(57) ABSTRACT

In a state where one of physical storage regions is allocated to each of unit regions included in a logical storage region, an apparatus identifies, from among the unit regions, first unit regions which have been allocated from physical storage regions whose allocations to the first unit regions are to be changed. The apparatus sequentially selects, from among the first unit regions, a second unit region as a candidate for data migration, and instructs data migration of the second unit region between the physical storage regions. The apparatus determines whether data migration of any one of the unit regions whose data has been instructed to be migrated is being executed on each of multiple divided regions obtained by dividing a physical storage region to which data of the second unit region is to be migrated, and instructs data migration of the second unit region based on the determination.

8 Claims, 12 Drawing Sheets

| TIER POOL NAME | UNIT REGION SIZE | LOW-LEVEL LAYERS | | |
|---|---|---|---|---|
| | | SUBPOOL NAME | DISK TYPE | RAID GROUP NAME |
| TP1 | 252 MB | TP1-L | NEARLINE | RG5, RG6 |
| TP2 | 504 MB | TP2-L | ONLINE | RG13, RG14 |
| TP3 | 1008 MB | TP3-L | NEARLINE | RG27, RG28, RG29 |

| MIDDLE-LEVEL LAYERS | | | HIGH-LEVEL LAYERS | | |
|---|---|---|---|---|---|
| SUBPOOL NAME | DISK TYPE | RAID GROUP NAME | SUBPOOL NAME | DISK TYPE | RAID GROUP NAME |
| TP1-M | ONLINE | RG3, RG4 | TP1-H | SSD | RG1, RG2 |
| — | — | — | TP2-H | SSD | RG11, RG12 |
| TP3-M | ONLINE | RG24, RG25, RG26 | TP3-H | SSD | RG21, RG22, RG23 |

| MIGRATION TYPE | DETAIL OF MIGRATION | ACCESS FREQUENCY RANGE | PRIORITY |
|---|---|---|---|
| C1 | MIGRATED TO LOW-LEVEL LAYER (TO SECURE REGION OF HIGH-LEVEL LAYER) | – | 1 |
| C2 | MIGRATED TO MIDDLE-LEVEL LAYER (TO SECURE REGION OF HIGH-LEVEL LAYER) | – | 2 |
| C3 | MIGRATED TO HIGH-LEVEL LAYER | HIGHER THAN xx | 3 |
| C3 | MIGRATED TO HIGH-LEVEL LAYER | FROM yy TO xx | 4 |
| C3 | MIGRATED TO HIGH-LEVEL LAYER | ... | 5 |
| C3 | MIGRATED TO HIGH-LEVEL LAYER | LOWER THAN yy | 6 |
| C4 | MIGRATED TO LOW-LEVEL LAYER (TO SECURE REGION OF MIDDLE-LEVEL LAYER) | – | 7 |
| C5 | MIGRATED TO MIDDLE-LEVEL LAYER | HIGHER THAN xx | 8 |
| C5 | MIGRATED TO MIDDLE-LEVEL LAYER | FROM yy TO xx | 9 |
| C5 | MIGRATED TO MIDDLE-LEVEL LAYER | ... | 10 |
| C5 | MIGRATED TO MIDDLE-LEVEL LAYER | LOWER THAN yy | 11 |
| C6 | MIGRATED TO MIDDLE-LEVEL LAYER | HIGHER THAN xx | 12 |
| C6 | MIGRATED TO MIDDLE-LEVEL LAYER | FROM yy TO xx | 13 |
| C6 | MIGRATED TO MIDDLE-LEVEL LAYER | ... | 14 |
| C6 | MIGRATED TO MIDDLE-LEVEL LAYER | LOWER THAN yy | 15 |
| C7 | MIGRATED TO LOW-LEVEL LAYER | HIGHER THAN xx | 16 |
| C7 | MIGRATED TO LOW-LEVEL LAYER | FROM yy TO xx | 17 |
| C7 | MIGRATED TO LOW-LEVEL LAYER | ... | 18 |
| C7 | MIGRATED TO LOW-LEVEL LAYER | LOWER THAN yy | 19 | ed # APPARATUS TO REDUCE A DATA-MIGRATION TIME FOR REARRANGING DATA BETWEEN STORAGE HIERARCHICAL LAYERS

CROSS-REFERENCE TO RELATED APPLICATION

This application is based upon and claims the benefit of priority of the prior Japanese Patent Application No. 2018-5583, filed on Jan. 17, 2018, the entire contents of which are incorporated herein by reference.

FIELD

The embodiments discussed herein are related to apparatus to reduce a data-migration time for rearranging data between storage hierarchical layers.

BACKGROUND

Storage hierarchical control of layering a memory device included in a storage device based on access performance and rearranging data between layers is known. For example, data that is accessed with high frequency is placed in a memory device of a high access rate, while data that is accessed with low frequency is placed in a memory device of a low access rate. When the data is placed in this manner, access processing may be executed at high speed.

As an example of a system using a storage hierarchical control technique, the following computation system has been proposed. In the computation system, storage destinations of data of objects (for example, a table, an index, and the like) in a database management system are controlled. Priorities are set for the objects based on types of the objects, and data of an object having a high priority is rearranged on a priority basis.

Examples of related art are Japanese Laid-open Patent Publication No. 2014-199596 and International Publication Pamphlet No. WO2013/164878.

SUMMARY

According to an aspect, an apparatus stores configuration information indicating a configuration of a plurality of physical storage regions that are respectively formed by storage devices having different levels of access performances. In a state where one of the plurality of physical storage regions is allocated to each of a plurality of unit regions included in a logical storage region, the apparatus identifies, from among the plurality of unit regions, multiple first unit regions which have been allocated from physical storage regions whose allocations to the first unit regions are to be changed. The apparatus sequentially selects, from among the multiple first unit regions, a second unit region as a candidate for data migration, and instructs data migration of the second unit region between the plurality of physical storage regions. When the second unit region is selected as a candidate for data migration from among the multiple first unit regions, the apparatus determines whether data migration of any one of the plurality of unit regions whose data has been instructed to be migrated is being executed on each of multiple divided regions obtained by dividing a physical storage region to which data of the second unit region is to be migrated, and instructs data migration of the second unit region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of a data configuration of a pool management table stored in the CM;

FIG. 8 is a diagram illustrating an example of a data configuration of a priority setting table;

DESCRIPTION OF EMBODIMENTS

In the storage hierarchical control, a data item to be migrated between layers is identified based on access frequencies of data items. When multiple data items to be migrated are identified, the data items are early placed in appropriate layers by reducing an entire time period for executing a process of migrating the data items, and as a result, the performance of access to the data items is improved. However, there is a problem with how the execution of the migration of the data items is controlled to reduce the entire time period for executing the migration process.

It is preferable to reduce a time period for executing a data migration process.

Hereinafter, embodiments are described with reference to the accompanying drawings.

First Embodiment

Figure 1:
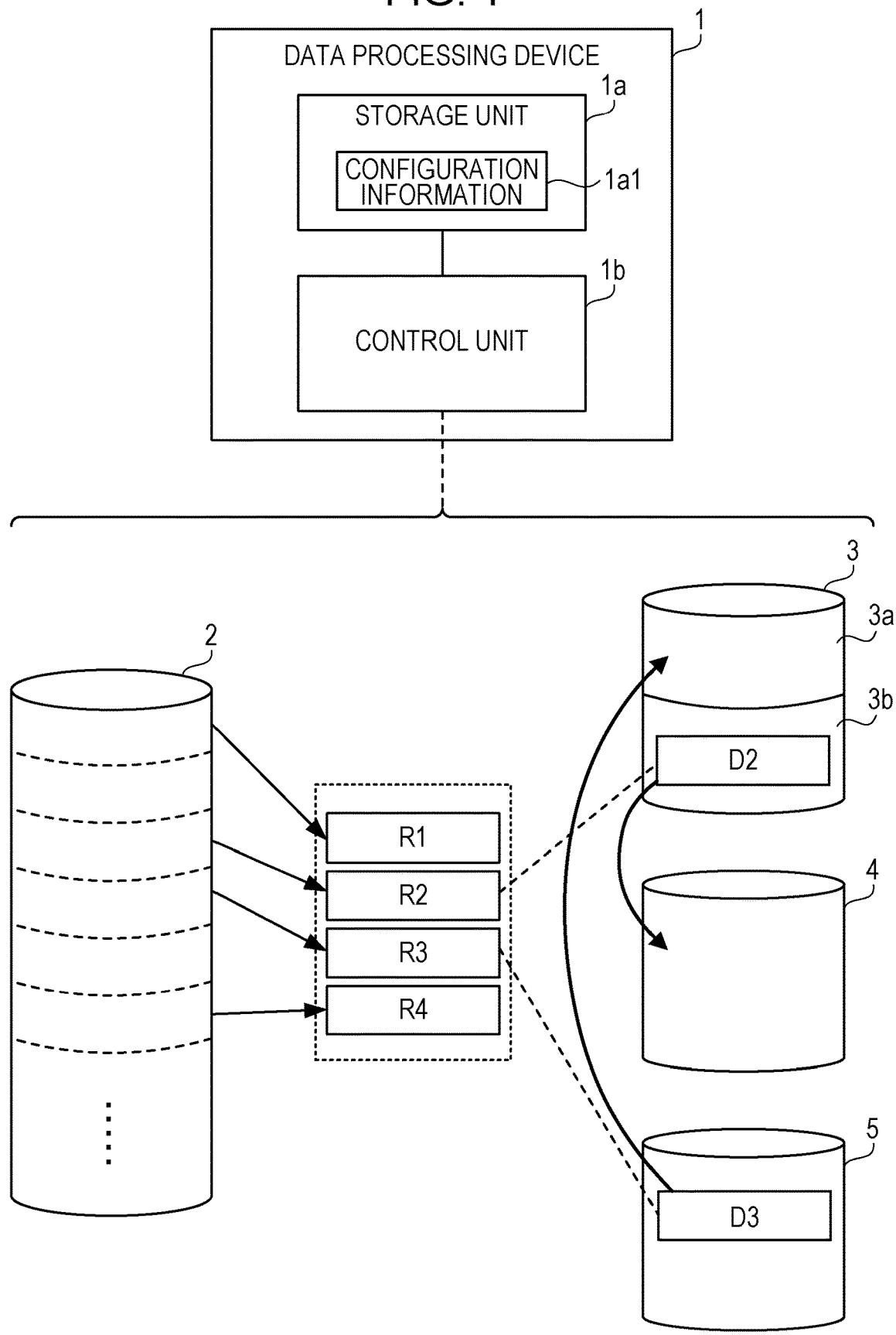
FIG. 1 is a diagram illustrating an example of a configuration of a data processing device according to a first embodiment and an example of a process to be executed by the data processing device.

FIG. 1 is a diagram illustrating an example of a configuration of a data processing device according to a first embodiment and an example of a process to be executed by the data processing device. A data processing device illustrated in FIG. 1 includes a storage unit 1*a* and a control unit 1*b*. The storage unit 1*a* is enabled by a storage region of a storage device included in the data processing device 1. The storage device included in the data processing device 1 is a random access memory (RAM), a hard disk drive (HDD), or the like. The control unit 1b is enabled as a processor included in the data processing device 1, for example.

The data processing device 1 allocates physical storage regions to multiple unit regions included in a logical storage region 2. The multiple physical storage regions allocated to the unit regions are prepared. In the first embodiment, three physical storage regions 3 to 5 are prepared as an example. The physical storage regions 3 to 5 are enabled using storage devices having different levels of access performance. A storage region is allocated from any of the physical storage regions 3 to 5 to each of the unit regions of the logical storage region 2. It is, however, sufficient if a storage region is allocated from any of the physical storage regions 3 to 5 to each of only unit regions in the logical storage region 2 that store data.

Configuration information 1a1 indicating configurations of the physical storage regions 3 to 5 is stored in the storage unit 1a. For example, the configuration information 1a1 includes capacities of the physical storage regions 3 to 5 and information on the storage devices enabling the physical storage regions 3 to 5.

In the aforementioned manner, the control unit 1b executes the following process in a state in which a storage region is already allocated from any of the physical storage regions 3 to 5 to each of the multiple unit regions of the logical storage region 2. When multiple first unit regions for which physical storage regions to be allocated to the first unit regions are to be changed are identified from the unit regions of the logical storage region 2, the control unit 1b sequentially selects candidates for data migration from among the multiple first unit regions. Then, the control unit 1b instructs the migration of data of the first unit regions selected as the candidates between physical storage regions. The process of sequentially selecting candidates for data migration and instructing the migration of data of the selected candidates is hereinafter referred to as "migration control process".

FIG. 1 assumes that unit regions R1 to R4 are identified as the first unit regions as an example. For example, the control unit 1b sequentially selects the unit regions R1, R2, R3, and R4 in this order as candidates for data migration. Then, the control unit 1b executes the migration control process on the selected unit regions. In the migration control process, the following process is executed.

When the control unit 1b selects a single unit region (hereinafter referred to as second unit region) as a candidate from among the first unit regions, the control unit 1b determines whether or not the migration of data of unit regions of which the data is already instructed to be migrated is being executed on each of multiple regions obtained by dividing a physical storage region that is a migration destination of data of the second unit region.

For example, it is assumed that the unit region R3 is selected as the candidate for the data migration. In addition, it is assumed that a storage region to be allocated is requested to be changed from the physical storage region 5 to the physical storage region 3 for the unit region R3 and that a migration destination of data D3 of the unit region R3 is the physical storage region 3. Furthermore, it is assumed that the physical storage region 3 is divided into two regions 3a and 3b. The divided regions 3a and 3b are enabled by different storage devices. For example, the divided regions 3a and 3b are enabled as different Redundant Arrays of Inexpensive Disks (RAID) groups.

In this case, the control unit 1b determines whether or not the migration of data of a unit region (any of the unit regions R1 and R2 in this case) of which the data is already instructed to be migrated is being executed on each of the divided regions 3a and 3b. Then, the control unit 1b controls a process of instructing the migration of the data of the unit region R3 based on the result of the determination. By executing this, a time period for executing a process of migrating the data may be reduced.

For example, it is assumed that the migration of data D2 of the unit region R2 is being executed on the divided region 3b. FIG. 1 assumes that a process of migrating the data D2 from the divided region 3b to the physical storage region 4 is being executed. In this case, when the migration of the data D3 of the unit region R3 to the divided region 3b is tried, the data D3 waits to be migrated until the completion of the migration of the data D2. Thus, for example, the control unit 1b instructs the migration of the data D3 to the divided region 3a in which data migration is not being executed. Thus, the data D2 and D3 is migrated in parallel, while the data D3 does not wait to be migrated. As a result, an entire time period for executing data migration may be reduced.

Although not illustrated, it is assumed that the migration of data of the unit regions other than the unit region R3 is being executed on each of the divided regions 3a and 3b. In this case, the migration of the data of the unit region R3 is set to an instruction waiting state, and the control unit 1b selects the next unit region R4 as a candidate for data migration and executes the migration control process on the unit region R4. Thus, the probability that there is a useless time period in which data of the unit region R4 is not migrated due to the waiting for the migration of the data D3 of the unit region R3 may be reduced and the efficiency of the data migration may be improved. As a result, the entire time period for executing the data migration may be reduced.

In this manner, a time period for a data migration process may be reduced by determining whether or not data migration is being executed on each of the divided regions 3a and 3b and controlling the process of instructing the migration of the data of the unit region R3 based on the result of the determination.

Second Embodiment

Next, a storage system according to a second embodiment is described.

Figure 2:
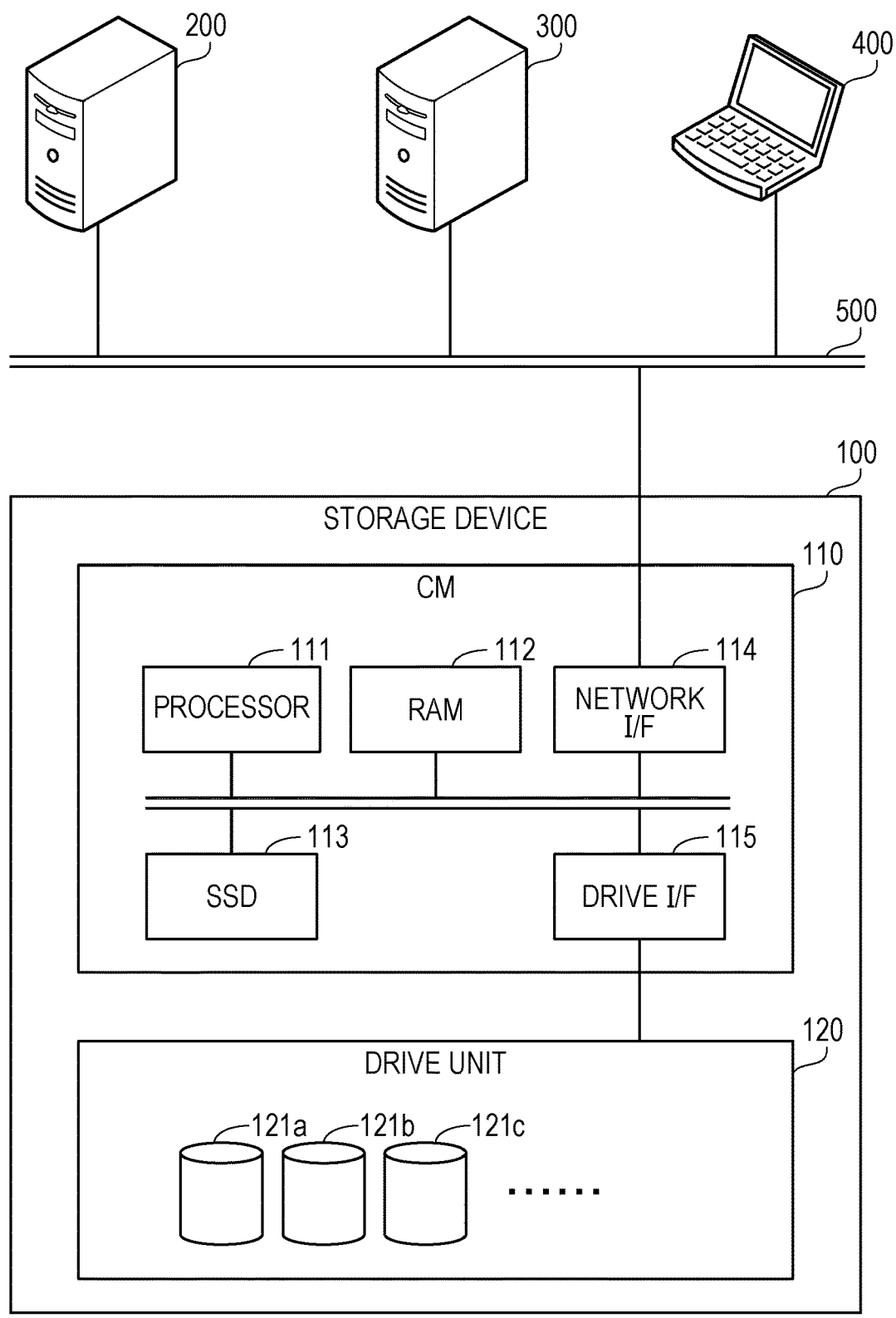
FIG. 2 is a diagram illustrating an example of a configuration of a storage system according to a second embodiment.

FIG. 2 is a diagram illustrating an example of a configuration of the storage system according to the second embodiment. The storage system illustrated in FIG. 2 includes a storage device 100, a host server 200, a managing server 300, and a management terminal 400. The storage device 100, the host server 200, the managing server 300, and the management terminal 400 are coupled to each other via a network 500. The network 500 is, for example, a local area network (LAN) or a broadband network such as a wide area network (WAN) or the Internet. Communication may be executed between the storage device 100 and the host server 200 via a storage area network (SAN).

The storage device 100 includes a controller module (CM) 110 and a drive unit 120. The CM 110 is a storage control device configured to access storage devices included in the drive unit 120 in accordance with a request from the host server 200. For example, the CM 110 sets logical volumes using storage regions of the storage devices included in the drive unit 120 and receives a request to access the logical volumes from the host server 200. The CM 110 is an example of the data processing device 1 illustrated in FIG. 1.

The drive unit 120 includes storage devices 121*a*, 121*b*, 121*c*, . . . to be accessed from the host server 200. The storage devices included in the drive unit 120 are of different types and have different levels of access performance. For example, the drive unit 120 includes a nearline HDD, an online HDD, and a solid state drive (SSD). In this case, access performance of the nearline HDD is lower than access performance of the online HDD, and the access performance of the online HDD is lower than access performance of the SSD.

The host server 200 is a computer configured to execute various types of business processes. The host server 200 transmits a request to access the logical volumes to the CM 110, thereby accessing the logical volumes.

The managing server 300 is a server computer configured to manage an operation of the storage device 100. For example, the managing server 300 executes hierarchy control on the storage device 100. For example, the managing server 300 periodically collects access frequencies of data within the logical volumes from the CM 110 and controls the CM 110 so that the data within the logical volumes is placed in storage devices having access performance appropriate for the access frequencies.

The management terminal 400 is a terminal device to be used by an administrator of the storage system. For example, the management terminal 400 sets the logical volumes and executes settings related to the layering of the storage regions in response to operations of the administrator.

Next, an example of a hardware configuration of the CM 110 is described with reference to FIG. 2. As illustrated in FIG. 2, the CM 110 includes a processor 111, a RAM 112, an SSD 113, a network interface (I/F) 114, and a drive interface (I/F) 115.

The processor 111 comprehensively controls the entire CM 110. The processor 111 is, for example, a central processing unit (CPU), a micro processing unit (MPU), a digital signal processor (DSP), an application specific integrated circuit (ASIC), or a programmable logic device (PLD). Alternatively, the processor 111 may be a combination of two or more of the CPU, the MPU, the DSP, the ASIC, and the PLD.

The RAM 112 is used as a main storage device of the CM 110. In the RAM 112, either or both of an operating system (OS) program to be executed by the processor 111 and an application program to be executed by the processor 111 is or are temporarily stored. In the RAM 112, various types of data to be used for a process to be executed by the processor 111 are stored.

The SSD 113 is used as an auxiliary storage device of the CM 110. In the SSD 113, the OS program, the application program, and the various types of data are stored. As the auxiliary storage device, another type of nonvolatile storage device such as an HDD may be used.

The network interface 114 is a communication interface configured to communicate with the host server 200 and the managing server 300 via the network 500. For example, a communication interface coupled to the host server 200 via a SAN or the like and a communication interface coupled to the managing server 300 via a LAN or the like may be installed independently of each other in the storage device 100.

The drive interface 115 is a communication interface configured to communicate with the storage devices 121*a*, 121*b*, 121*c*, . . . included in the drive unit 120.

Although not illustrated, each of the host server 200, the managing server 300, and the management terminal 400 may be enabled as a computer including a processor, a main storage device, and an auxiliary storage device.

Next, hierarchy control to be executed in the storage system is described.

Figure 3:
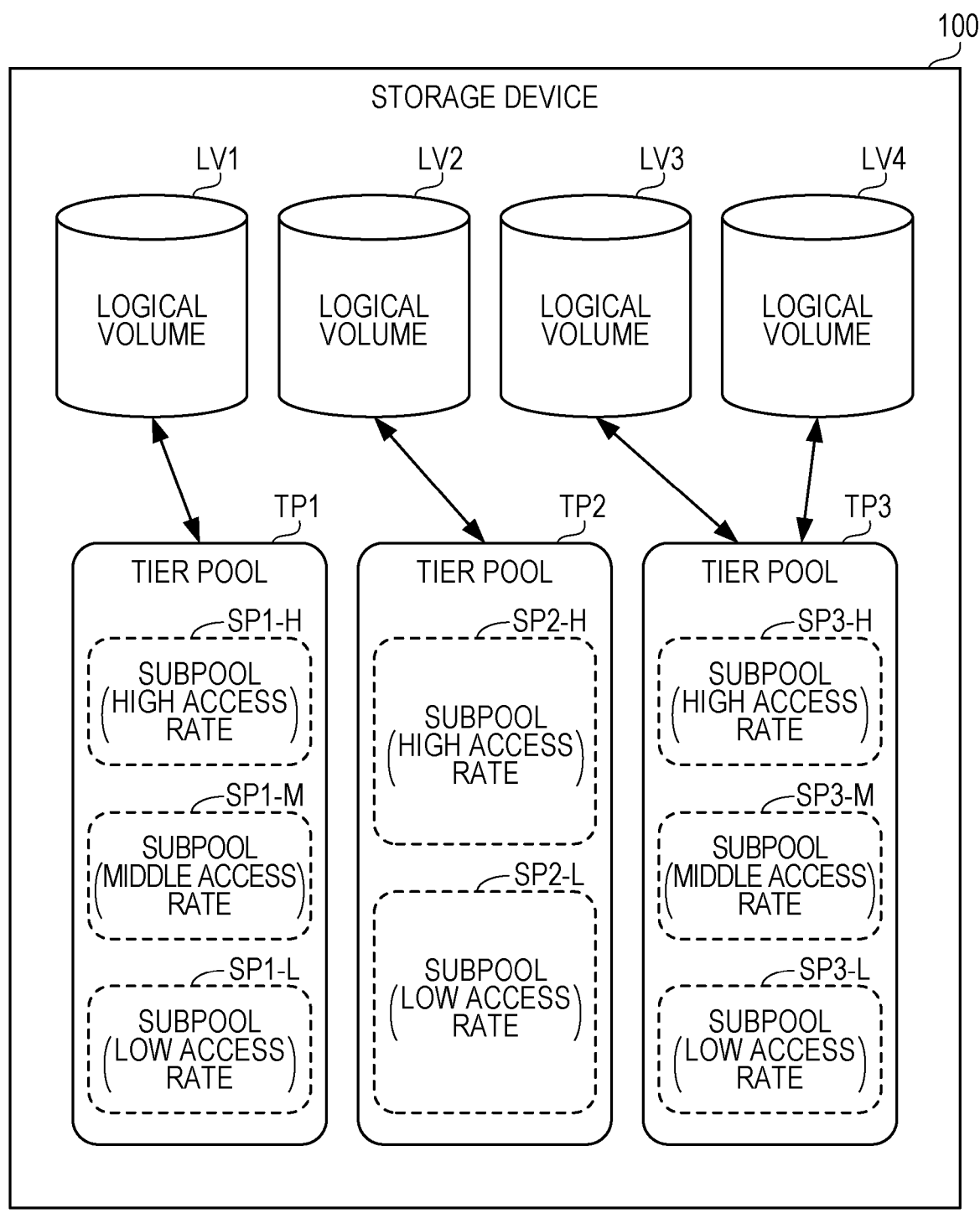
FIG. 3 is a diagram illustrating an example of settings of layered memory regions.

FIG. 3 is a diagram illustrating an example of settings of layered storage regions. As described above, in the storage device 100, the logical volumes to be accessed by the host server 200 are set. In addition, in the storage device 100, tier pools from which physical storage regions corresponding to the logical volumes are allocated are set. The tier pools are storage regions, each of which is enabled by one or more storage devices included in the drive unit 120. Storage regions are allocated from the tier pools to unit regions having a predetermined size and obtained by dividing the logical volumes. In the second embodiment, however, storage regions are allocated from the tier pools to only unit regions storing data among the unit regions of the logical volumes in accordance with a request from the host server 200.

Each of the tier pools is divided into multiple subpools enabled by storage devices of different access rates. Thus, each of the tier pools is layered and has multiple layered storage regions of different access rates. A storage region is allocated from any of the subpools to each of the unit regions based on access frequencies received from the host server 200. For example, a subpool enabled by a storage device of a high access rate is allocated to a unit region that is accessed with high frequency, while a subpool enabled by a storage device of a low access rate is allocated to a unit region that is accessed with low frequency.

Thus, in the storage device 100, as data is accessed with higher frequency, the data is accessed at a higher rate. For example, as data is accessed from the host server 200 with higher frequency, a response speed to an access request from the host server 200 is higher. As a result, response performance to access requests from the host server 200 is improved.

The following description assumes that one or more nearline HDDs, one or more online HDDs, and one or more SSDs are included in the drive unit 120 and used as storage devices of different access rates in ascending order of access rate. A layer of a subpool enabled by one or more nearline HDDs is referred to as "low-level layer" in some cases, a layer of a subpool enabled by one or more online HDDs is referred to as "middle-level layer" in some cases, and a layer of a subpool enabled by one or more SSDs is referred to as "high-level layer" in some cases.

In FIG. 3, as an example, a logical volume LV1 is set and a tier pool TP1 is set as a pool from which a physical storage region corresponding to the logical volume LV1 is to be allocated. In the tier pool TP1, subpools SP1-L, SP1-M, and SP1-H of 3 layers are set. The subpool SP1-L is enabled by one or more nearline HDDs. The subpool SP1-M is enabled by one or more online HDDs. The subpool SP1-H is enabled by one or more SSDs. Thus, an access rate of the subpool SP1-H is the highest among the subpools SP1-H, SP1-M, and the SP1-L, and an access rate of the subpool SP1-L is the lowest among the subpools SP1-H, SP1-M, and SP1-L.

In the storage device 100, multiple tier pools of different unit region sizes may be set. A storage region may be allocated from any of the tier pools to each of the logical volumes. In the example illustrated in FIG. 3, not only the tier pool TP1 but also tier pools TP2 and TP3 are set in the storage device 100. In addition, not only the logical volume LV1 but also logical volumes LV2 to LV4 are set in the storage device 100. A storage region is allocated to the logical volume LV2 from the tier pool TP2, and storage regions are allocated to the logical volumes LV3 and LV4 from the tier pool TP3.

Each of the tier pools TP2 and TP3 is divided into multiple subpools. In the example illustrated in FIG. 3, a subpool SP2-L enabled by one or more nearline HDDs and a subpool SP2-H enabled by one or more SSDs are set in the tier pool TP2. In addition, a subpool SP3-L enabled by one or more nearline HDDs, a subpool SP3-M enabled by one or more online HDDs, and a subpool SP3-H enabled by one or more SSDs are set in the tier pool TP3.

The sizes of unit regions serving as units for management of data migration may be reduced. In the case, as the size of divided data to be migrated to a determined layer of a migration destination is smaller, the layer in which the data is to be placed is more appropriate for an access frequency. On the other hand, since the number of unit regions serving as units for the management increases, the efficiency of the management may be reduced. Thus, the sizes of the unit regions may be arbitrarily set by a user based on characteristics of data to be stored in the logical volumes.

As another example, capacities of the tier pools may be determined based on the maximum possible numbers of unit regions to be allocated from the tier pools. In this case, the capacities of the tier pools may be expanded by increasing the sizes of the unit regions. In this method, the maximum possible numbers of unit regions to be managed as allocation destinations are the same for the tier pools, regardless of the sizes of the unit regions. Thus, a method for managing the tier pools may be common and the efficiency of the management may be improved, regardless of the sizes of the unit regions.

Figure 4:
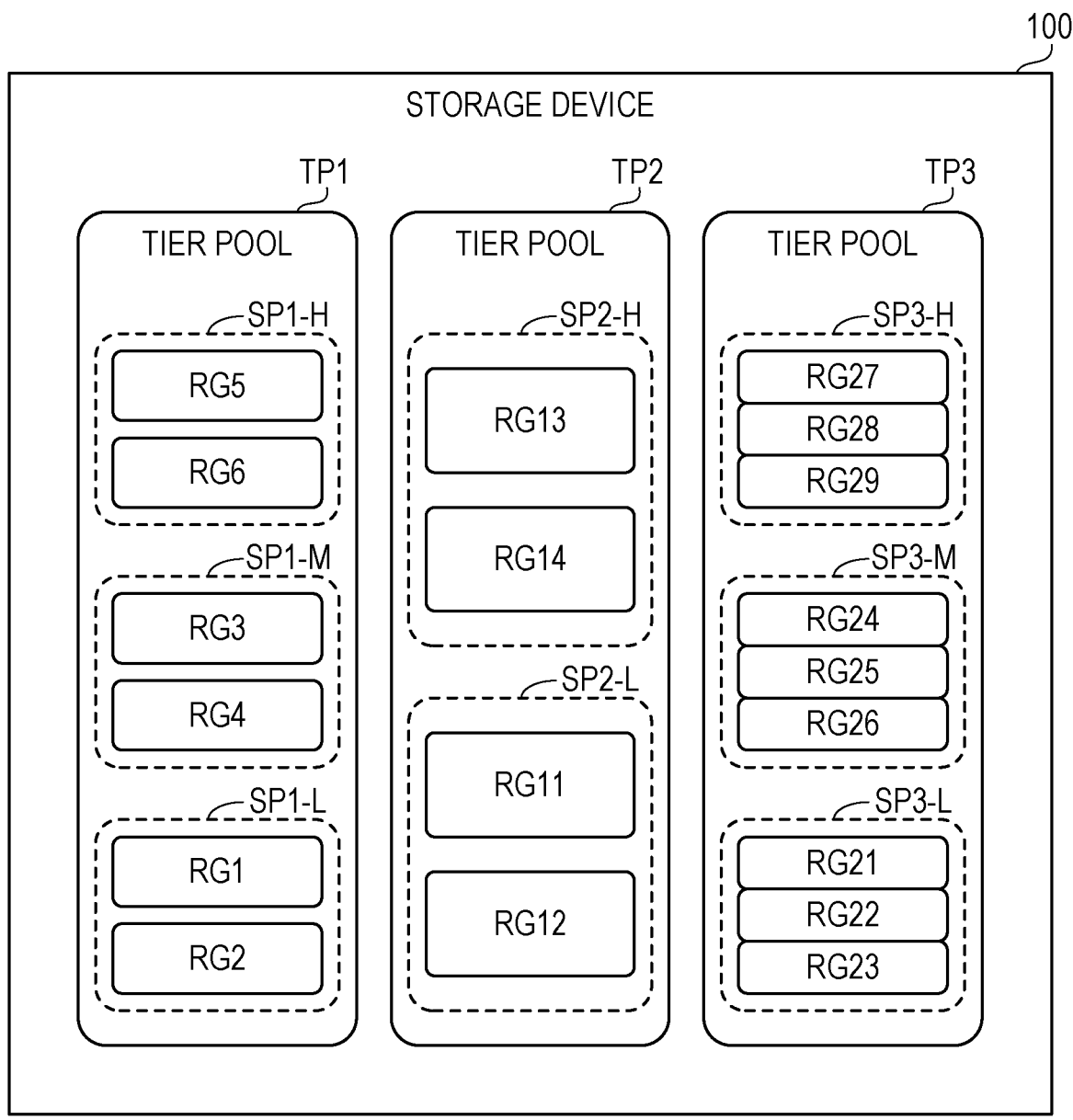
FIG. 4 is a diagram illustrating an example of settings of RAID groups in subpools.

FIG. 4 is a diagram illustrating an example of settings of RAID groups in the subpools. One or more RAID groups are set in each of the subpools. Each of the RAID groups is a logical storage region for which writing is controlled so that data is made redundant in multiple storage devices. Physical storage regions of the subpools are set by setting the RAID groups in the subpools. For example, the storage regions of the subpools are enabled by multiple storage devices included in the RAID groups and to be controlled by RAID.

In the example illustrated in FIG. 4, RAID groups RG1 and RG2 are set in the subpool SP1-L, RAID groups RG3 and RG4 are set in the subpool SP1-M, and RAID groups RG5 and RG6 are set in the subpool SP1-H. In addition, RAID groups RG11 and RG12 are set in the subpool SP2-L, and RAID groups RG13 and RG14 are set in the subpool SP2-H. Furthermore, RAID groups RG21 to RG23 are set in the subpool SP3-L, RAID groups RG24 to RG26 are set in the subpool SP3-M, and RAID groups RG27 to RG29 are set in the subpool SP3-H.

Next, a process to be executed by the CM 110 of the storage device 100 and the managing server 300 is described in detail.

Figure 5:
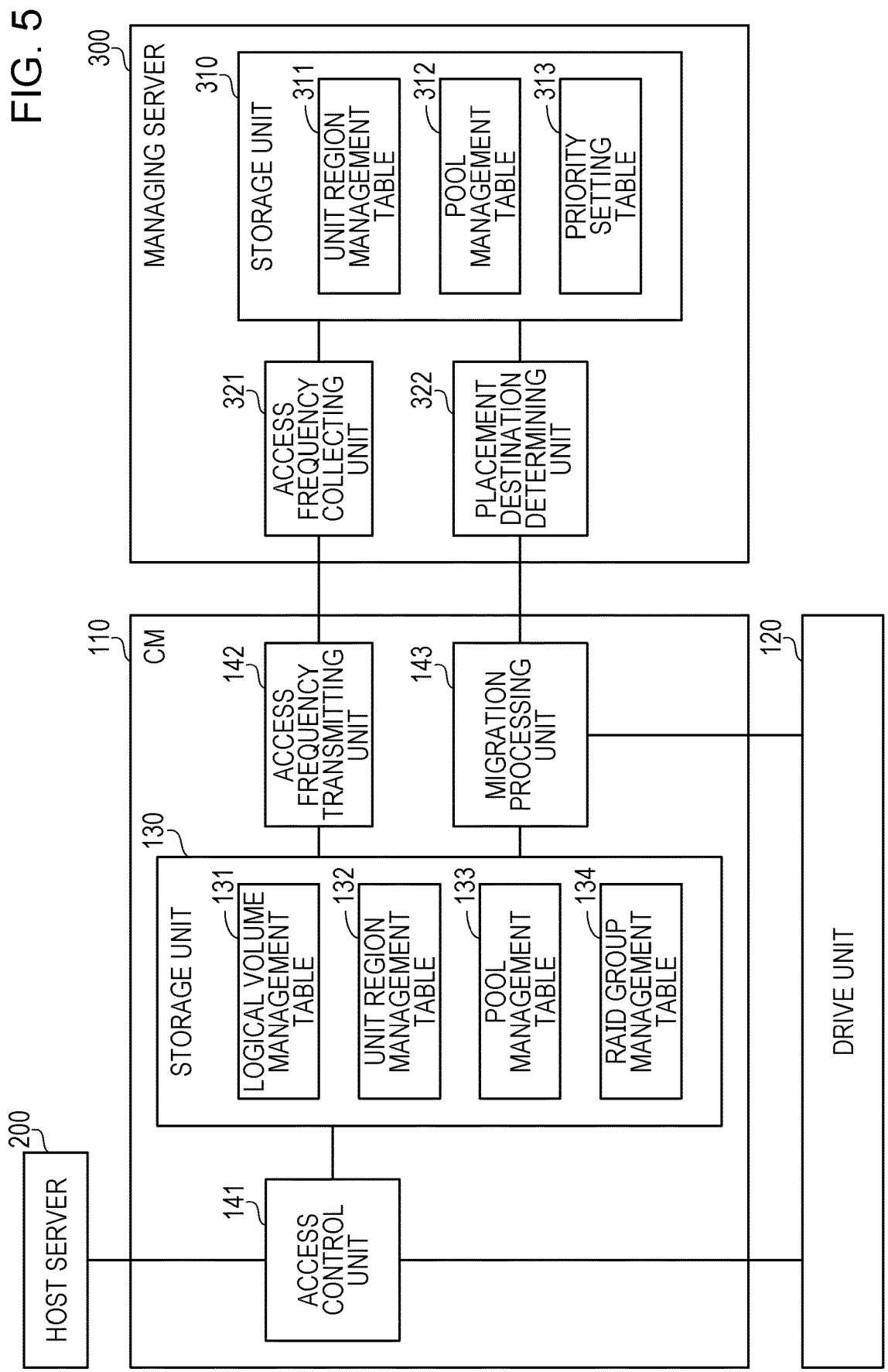
FIG. 5 is a block diagram illustrating an example of a configuration of processing functions included in a CM and an example of a configuration of processing functions included in a managing server.

FIG. 5 is a block diagram illustrating an example of a configuration of processing functions included in the CM and an example of a configuration of processing functions included in the managing server.

The CM 110 includes a storage unit 130, an access control unit 141, an access frequency transmitting unit 142, and a migration processing unit 143. The storage unit 130 is enabled as a storage region of a storage device that is included in the CM 110 and is the RAM 112 or the like. Processes to be executed by the access control unit 141, the access frequency transmitting unit 142, and the migration processing unit 143 are enabled by causing the processor 111 to execute a predetermined program, for example.

In the storage unit 130, a logical volume management table 131, a unit region management table 132, a pool management table 133, and a RAID group management table 134 are stored.

In the logical volume management table 131, setting information on the logical volumes is registered. For example, in the logical volume management table 131, a volume name, a capacity, a pool name indicating a tier pool from which a storage region is allocated, and the like are registered for each of the logical volumes.

In the unit region management table 132, information on the unit regions included in the logical volumes is registered. For example, in the unit region management table 132, a subpool name indicating a storage region allocated from a tier pool, a RAID group name, an offset, the number of times of access from the host server 200 in a unit time period, and the like are registered for each of the unit regions.

In the pool management table 133, information on the tier pools is registered. For example, in the pool management table 133, a unit region size, information indicating a set subpool, information indicating a RAID group set in the subpool, information indicating an available region, and the like are registered for each of the tier pools.

In the RAID group management table 134, information on the set RAID groups is registered. For example, in the RAID group management table 134, a RAID level, information indicating a storage device to be used, and the like are registered for each of the RAID groups.

The access control unit 141 executes access control in accordance with a request received from the host server 200 to access a logical volume. For example, when the access control unit 141 receives a request to read data stored in any of unit regions included in the logical volume, the access control unit 141 references the unit region management table 132 and identifies a storage region included in a RAID volume (logical storage region corresponding to a RAID group) storing the data. Then, the access control unit 141 references the RAID group management table 134, identifies a physical storage region (storage region of a storage device within the drive unit 120) corresponding to the identified storage region, reads the data from the identified physical storage region, and transmits the read data to the host server 200.

When the access control unit 141 receives a request to write new data to any of the unit regions included in the logical volume, the access control unit 141 references the logical volume management table 131 and identifies a tier pool associated with the logical volume. The access control unit 141 references the pool management table 133, identifies an available region from the identified tier pool, and writes the data to the identified available region. In addition, the access control unit 141 registers, in a record included in the unit region management table 132 and corresponding to the unit region, information indicating the storage region to which the data has been written. The available region to which the data is to be written is identified from a predetermined subpool (for example a subpool of a high-level layer) among subpools included in the identified tier pool, for example.

The access frequency transmitting unit 142 collects access frequencies of the unit regions in a certain time period and transmits the collected access frequencies as access frequency information to the managing server 300. The access frequency information is transmitted as information in which values of the access frequencies of the unit regions are listed, for example.

The migration processing unit 143 receives migration instruction information from the managing server 300 and migrates data (or places the data again) between layers (or between subpools) based on the migration instruction information. The migration instruction information is received as information in which unit regions of which data is to be migrated and layers to which the data is to be migrated are listed. As described later, priorities are set for the unit regions in the migration instruction information.

The managing server 300 includes a storage unit 310, an access frequency collecting unit 321, and an placement destination determining unit 322. The storage unit 310 is enabled as a storage region of a storage device (not illustrated) included in the managing server 300. Processes to be executed by the access frequency collecting unit 321 and the placement destination determining unit 322 are enabled by causing a processor (not illustrated) included in the managing server 300 to execute a predetermined program, for example.

In the storage unit 310, a unit region management table 311, a pool management table 312, and a priority setting table 313 are stored.

In the unit region management table 311, information on the unit regions included in the logical volumes is registered. For example, in the unit region management table 311, a subpool name indicating a storage region allocated from a tier pool, the number of times of access from the host server 200 in a unit time period, and the like are registered for each of the unit regions. The unit region management table 311 is different from the unit region management table 132 of the CM 110 in that the positions of storage regions are not managed in a RAID group basis in the unit region management table 311.

In the pool management table 312, information on the tier pools is registered. For example, in the pool management table 312, a unit region size, information indicating a set subpool, information indicating an available region, and the like are registered for each of the tier pools. The pool management table 312 is different from the pool management table 133 of the CM 110 in that available regions are not managed on a RAID group basis in the pool management table 312.

In the priority setting table 313, a requirement for setting priorities for unit regions as migration targets is set. In the priority setting table 313, priorities are basically set based on combinations of layers of migration destinations and access frequencies.

The access frequency collecting unit 321 collects access frequencies of the unit regions from the CM 110 at certain time intervals. Information of the collected access frequencies is stored in the unit region management table 311.

The placement destination determining unit 322 determines, based on the collected access frequencies, layers (subpools) in which data of the unit regions is to be placed. Then, the placement destination determining unit 322 extract, as a migration target, a unit region of which data is to be migrated to a determined placement destination that is different from a current placement destination. Then, the placement destination determining unit 322 transmits, to the CM 110, migration instruction information indicating an instruction to migrate, between layers, the data of the unit region extracted as the migration target.

The placement destination determining unit 322 instructs the CM 110 to collectively migrate data from multiple unit regions extracted as migration targets. In this case, the placement destination determining unit 322 sets priorities for the respective multiple unit regions based on the priority setting table 313. In the migration instruction information to be transmitted, information indicating a migration destination layer and a priority are set for each of the multiple unit regions.

Figure 6:
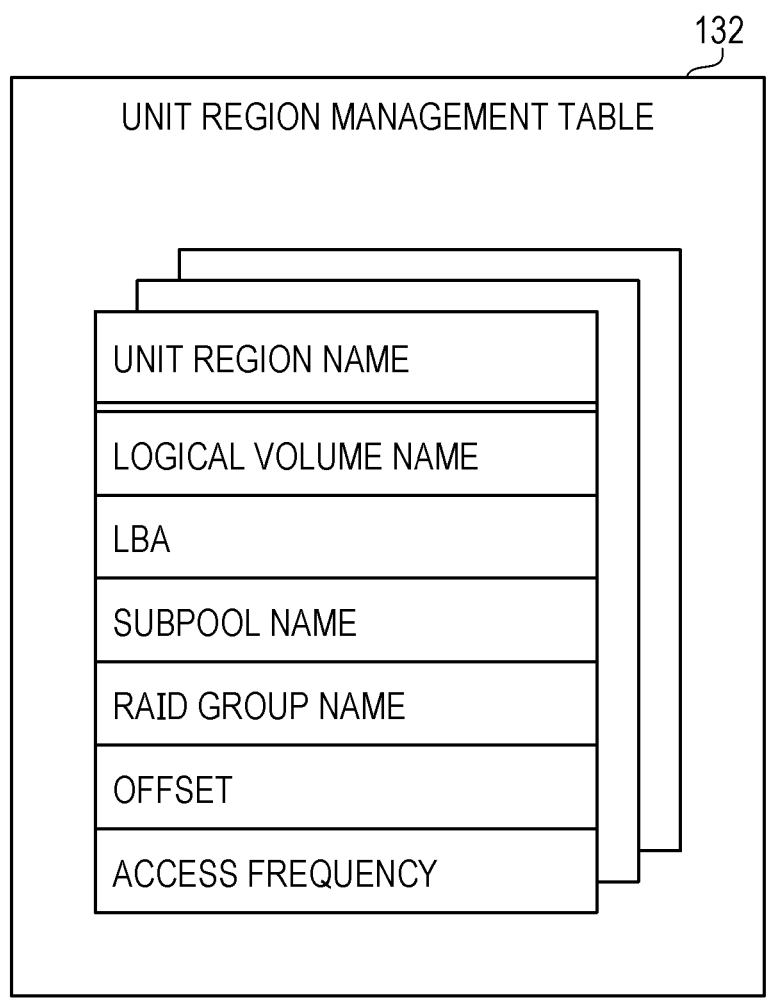
FIG. 6 is a diagram illustrating an example of a data configuration of a unit region management table stored in the CM.

FIG. 6 is a diagram illustrating an example of a data configuration of the unit region management table stored in the CM. The unit region management table 132 stored in the CM 110 includes records for the respective unit regions. Each of the records includes items for a unit region name, a logical volume name, a logical block address (LBA), a subpool name, a RAID group name, an offset, and an access frequency.

The unit region name indicates information identifying a unit region. The logical volume name indicates information identifying a logical volume to which the unit region belongs. The LBA indicates a top logical address of the unit region belonging to the logical volume. The subpool name indicates information identifying a subpool allocated to the unit region. The RAID group name indicates information identifying a RAID group to which a storage region allocated to the unit region belongs. The offset indicates a position in a RAID volume corresponding to the RAID group for the storage region allocated to the unit region.

The access frequency indicates the number of times that the unit region has been accessed by the host server 200 in a certain time period.

In the second embodiment, as an example, the access frequency collecting unit 321 of the managing server 300 divides a time period for collecting the access frequencies into fixed unit time periods and collects the access frequencies from the CM 110 for each of the unit time periods. In the access frequency item of the unit region management table 132, the numbers of times of access in a unit time period are registered. For example, values of the access frequencies are incremented by the access control unit 141 every time the host server 200 requests the CM 110 to write data to the unit regions and read data from the unit regions. When a certain time period corresponding to a unit time period elapses and the CM 110 is requested by the access frequency collecting unit 321 to transmit the access frequency information, the access frequency transmitting unit 142 causes values registered in the access frequency item to be included in the access frequency information, transmits the access frequency information including the values to the access frequency collecting unit 321, and resets the values registered in the access frequency item to 0.

By executing the aforementioned process, the access frequencies in the unit time period are held in the access frequency item of the unit region management table 132 stored in the CM 110 at the end of the unit time period. Since the aforementioned process is executed, "access frequencies" are defined as "the numbers of times of access in a unit time period" in the second embodiment.

Although not illustrated, the unit region management table 311 stored in the managing server 300 includes records for the respective unit regions. Each of the records includes items for a unit region name, a logical volume name, an LBA, a subpool name, and an access frequency, but does not include items for a RAID group name and an offset. In the items for unit region names, logical volume names, LBAs, and subpool names, the same values as those registered in the items included in the unit region management table 132 of the CM 110 and corresponding to the items of the unit region management table 311 are registered.

When the access frequency collecting unit 321 collects access frequencies from the CM 110, and values of the collected access frequencies are larger than values currently registered in the access frequency item of the unit region management table 311, the access frequency collecting unit 321 updates the currently registered values to the collected values. Thus, when a collection time period ends, the maximum values among access frequencies in the unit time periods of the collection time period are registered in the access frequency item.

FIG. 7 is a diagram illustrating an example of a data configuration of the pool management table stored in the CM. The pool management table 133 stored in the CM 110 includes records for the respective set tier pools. Each of the records includes an item for a unit region size and includes items for a subpool name, a disk type, and a RAID group name for a low-level layer, items for a subpool name, a disk type, and a RAID group name for a middle-level layer, and items for a subpool name, a disk type, and a RAID group name for a high-level layer.

The unit region size indicates the size of a unit region included in a tier pool. The subpool names indicate information identifying subpools set in the tier pool. The disk types indicate the types of storage devices enabling the subpools. The RAID group names indicate information identifying RAID groups set in the subpools.

Although not illustrated, the pool management table 312 stored in the managing server 300 includes records for the respective set tier pools. Each of the records includes items for a unit region size and a subpool name, but does not include an item for a RAID group name. Thus, the managing server 300 recognizes configurations of the tier pools on a subpool basis (or layer basis) but does not recognize the configurations of the tier pools on a RAID group basis. In the items for unit region sizes and subpools, the same values as those registered in the items included in the pool management table 133 of the CM 110 and corresponding to the items of the pool management table 312 are registered.

Although not illustrated, information indicating the sizes of the subpools and information to be used to manage available regions of the subpools are actually held in the pool management tables 133 and 312.

Next, data migration control between layers based on priorities is described.

As described above, when the placement destination determining unit 322 of the managing server 300 extracts unit regions as migration targets, the placement destination determining unit 322 instructs the CM 110 to collectively migrate data of the extracted unit regions. In this case, the placement destination determining unit 322 sets priorities for the unit regions. The migration processing unit 143 of the CM 110 migrates the data between layers in order from the highest priority for the multiple unit regions of which the data is already instructed to be migrated.

As a method for determining the priorities, there is a method for determining the priorities based on a "migration route requirement" indicating layers from which data is to be migrated and layers to which the data is to be migrated, for example. For example, an access frequency of a unit region of which data is already instructed to be migrated from a middle-level layer to a high-level layer is higher than an access frequency of a unit region of which data is already instructed to be migrated from a low-level layer to the middle-level layer. Thus, the urgency of the migration from the middle-level layer to the high-level layer is higher than the urgency of the migration from the low-level layer to the middle-level layer. Thus, a higher priority is set for the migration from the middle-level layer to the high-level layer. In addition, for example, an access frequency of a unit region of which data is already instructed to be migrated from a lower-level one of two layers to a higher-level one of the two layers is higher than an access frequency of a unit region of which data is already instructed to be migrated from the higher-level layer to the lower-level layer. Thus, the urgency of the migration to the higher-level layer is higher than the urgency of the migration to the lower-level layer. Thus, a higher priority is set for the migration to the higher-level layer.

In addition, priorities may be set for unit regions for which the same migration route is indicated by the migration route requirement, based on an "access frequency requirement" indicating access frequencies. For example, as an access frequency is higher, the urgency of migration is higher. Thus, as an access frequency of a unit region is higher, a higher priority is set for the unit region.

However, when priorities are set using the migration route requirement and the access frequency requirement, hierarchy control that is optimal for an actual state may not be enabled. For example, a requirement that is not the aforementioned requirements and affects the urgency of data migration may exist. In addition, the urgency of data migration may vary depending on a processing status or setting environment of the CM 110 in which data migration is executed. Furthermore, it is considered that the processing efficiency of the CM 110 may be reduced depending on positions at which data is placed in physical storage regions belonging to the same layer.

To solve the aforementioned problems, the following priority determination control is executed using the aforementioned requirements and another requirement in the managing server 300 in the second embodiment. In addition, the following data migration control (1) to (4) is executed in the CM 110.

Priority Determination Control by Managing Server

When certain data is to be migrated from a certain layer to a higher-level layer and an available region does not exist in the higher-level layer, the migration processing unit 143 of the CM 110 migrates data of the higher-level layer to a lower-level layer and thereafter migrates the certain data to the higher-level layer. Migrating data to a lower-level layer to secure an available region of a higher-level layer is hereinafter referred to as "region securement migration" in some cases.

When certain data is to be migrated to a higher-level layer and data of the higher-level layer is to be migrated to a lower-level layer to secure a region of the higher-level layer, the urgency of the region securement migration of the data to the lower-level layer is higher than the urgency of the migration of the certain data to the higher-level layer. Thus, the placement destination determining unit 322 of the managing server 300 determines priorities using the migration route requirement, the access frequency requirement, and a requirement for determining whether or not migration is region securement migration.

FIG. 8 is a diagram illustrating an example of a data configuration of the priority setting table. In the second embodiment, the placement destination determining unit 322 determines priorities based on the priority setting table 313. FIG. 8 illustrates an example in which a tier pool has 3 layers.

In the priority setting table 313, migration types C1 to C7 are set for migration details, and different priorities are associated with the migration types C1 to C7. The migration types C3 and C5 to C7 are determined based on the migration route requirement. Priorities are set for the migration type C3 indicating migration from a middle-level layer to a high-level layer, the migration type C5 indicating migration from a low-level layer to the middle-level layer, the migration type C6 indicating migration from the high-level layer to the middle-level layer, and the migration type C7 indicating migration from the middle-level layer to the low-level layer in order from the highest priority.

Multiple priorities are set for each of the migration types C3 and C5 to C7 based on the access frequency requirement. For example, different priorities are set for each of the migration types C3 and C5 to C7 for a predetermined number of access frequency ranges. As an access frequency is higher, a higher priority is set.

The migration types C1, C2, and C4 indicate region securement migration. The migration type C1 indicates migration from the middle-level layer to the low-level layer for securement of a region of the high-level layer. When certain data is to be migrated from the high-level layer to the middle-level layer to secure an available region of the high-level layer and an available region does not exist in the middle-level layer, data of the middle-level layer is to be migrated to the low-level layer to secure an available region in the middle-level layer. The migration type C1 indicates the migration of the data to the low-level layer in this case. Thus, the highest priority is set for the data migration indicated by the migration type C1. The migration type C2 indicates the migration from the high-level layer to the middle-level layer for securement of a region of the high-level layer. The second highest priority after the migration type C1 is set for the migration type C2.

The migration type C4 indicates the migration from the middle-level layer to the low-level layer for securement of a region of the middle-level layer. The data migration indicated by the migration type C4 is executed for data migration corresponding to the migration type C5 in order to migrate data from the low-level layer to the middle-level layer. A priority that is higher than priorities set for the migration type C5 is set for the migration type C4.

The placement destination determining unit 322 references the priority setting table 313 and appropriately sets priorities based on the requirement for determining whether or not migration is region securement migration.

When the tier pool has 2 layers, a priority (value indicating the highest priority) higher than that set for migration from the low-level layer to the high-level layer is set for migration for securement of a region of the high-level layer.

Data Migration Control (1) in CM

As exemplified in FIG. 4, multiple RAID groups may be set in a subpool of a certain layer. The RAID groups are enabled by different storage devices, respectively. Thus, by migrating data from or to different RAID groups in parallel, a processing efficiency of data migration may be improved and an entire time period for migrating data may be reduced.

To migrate data to a certain subpool, the migration processing unit 143 of the CM 110 selects, as a data migration destination from among RAID groups set in the subpool, a RAID group other than RAID groups on which data migration is being executed. Thus, the data migration may be executed in parallel, and as a result, the entire time period for migrating the data may be reduced.

Data Migration Control (2) in CM

When the migration processing unit 143 newly tries to migrate data to a certain subpool and data migration is being executed on all RAID groups set in the certain subpool, the migration processing unit 143 waits for the completion of data migration being executed in any of the RAID groups. If the migration processing unit 143 waits to execute data migration on the other RAID groups until the completion of the data migration executed on the RAID group, a time period for the waiting for the execution of the data migration is useless and the processing efficiency is low.

Thus, in the aforementioned case, the migration processing unit 143 temporarily waits to execute the newly tried data migration and executes data migration for which the next highest priority has been set. Thus, the migration processing unit 143 may efficiently migrate data from a unit region of which the data is already instructed by the managing server 300 to be migrated. For example, the probability that a useless time period in which data migration is not newly executed due to the waiting for the execution of the data migration exists may be reduced, and as a result, an entire time period for migrating data may be reduced.

Data Migration Control (3) in CM

When an access frequency of a certain unit region increases, data is migrated to a higher-level layer. The managing server 300, however, determines a data migration layer based on the access frequency immediately before the determination. Thus, the access frequency may change before the data is actually migrated to the higher-level layer.

When the migration processing unit 143 tries to migrate data to the higher-level layer, a unit region whose current access frequency is very high and for which the urgency of migration is determined to be high exists among other unit regions for which the same priority as that set for the certain unit region has been set, the migration processing unit 143 migrates data of the unit region on a priority basis.

For example, when a current access frequency of a certain unit region of which data is to be migrated is lower than a predetermined value, the migration processing unit 143 confirms an access frequency of another unit region for which the same priority as that set for the certain unit region has been set. When an access frequency of another unit region among the other unit regions is equal to or higher than the predetermined value, the migration processing unit 143 migrates data of the other unit region before the migration of the data of the certain unit region. In addition, in another example of the process, when a certain unit region whose access frequency is higher than that of a unit region of which data is currently tried to be migrated exists among the other unit regions for which the same priority has been set, the migration processing unit 143 may migrate data of the certain unit region before the migration of data of the unit region of which the data is currently tried to be migrated.

In this process, the order that data is to be migrated may be set to be appropriate based on changes in access frequencies. For example, a storage region of a high access rate may be allocated to a unit region whose access frequency is high, and as a result, a response speed to an access request from the host server 200 may be improved.

Data Migration Control (4) in CM

As described above, in the second embodiment, the sizes of the unit regions are variable. The CM 110 measures access frequencies of the unit regions as the numbers of times of access in a fixed unit time period. In this method, however, in the case where the numbers of times of access in the unit time period are the same, as the size of a unit region is smaller, an access frequency per capacity (input output operations per second (IOPS)) is higher. Thus, in the case where the numbers of times of access in the unit time period are the same, as the size of a unit region is smaller, the urgency of the migration of data of the unit region is higher.

The migration processing unit 143 migrates, on a priority basis, data of a small unit region among multiple unit regions for which the same priority has been set. Thus, the order that data is to be migrated may be appropriate so that access frequencies are appropriately reflected in the order that the data is to be migrated. For example, a storage region of a high access rate may be early allocated to a unit region whose access frequency is high, and as a result, a response speed to an access request from the host server 200 may be improved.

Next, processes to be executed by the managing server 300 and the CM 110 are described using a sequence diagram and flowcharts.

Figure 9:
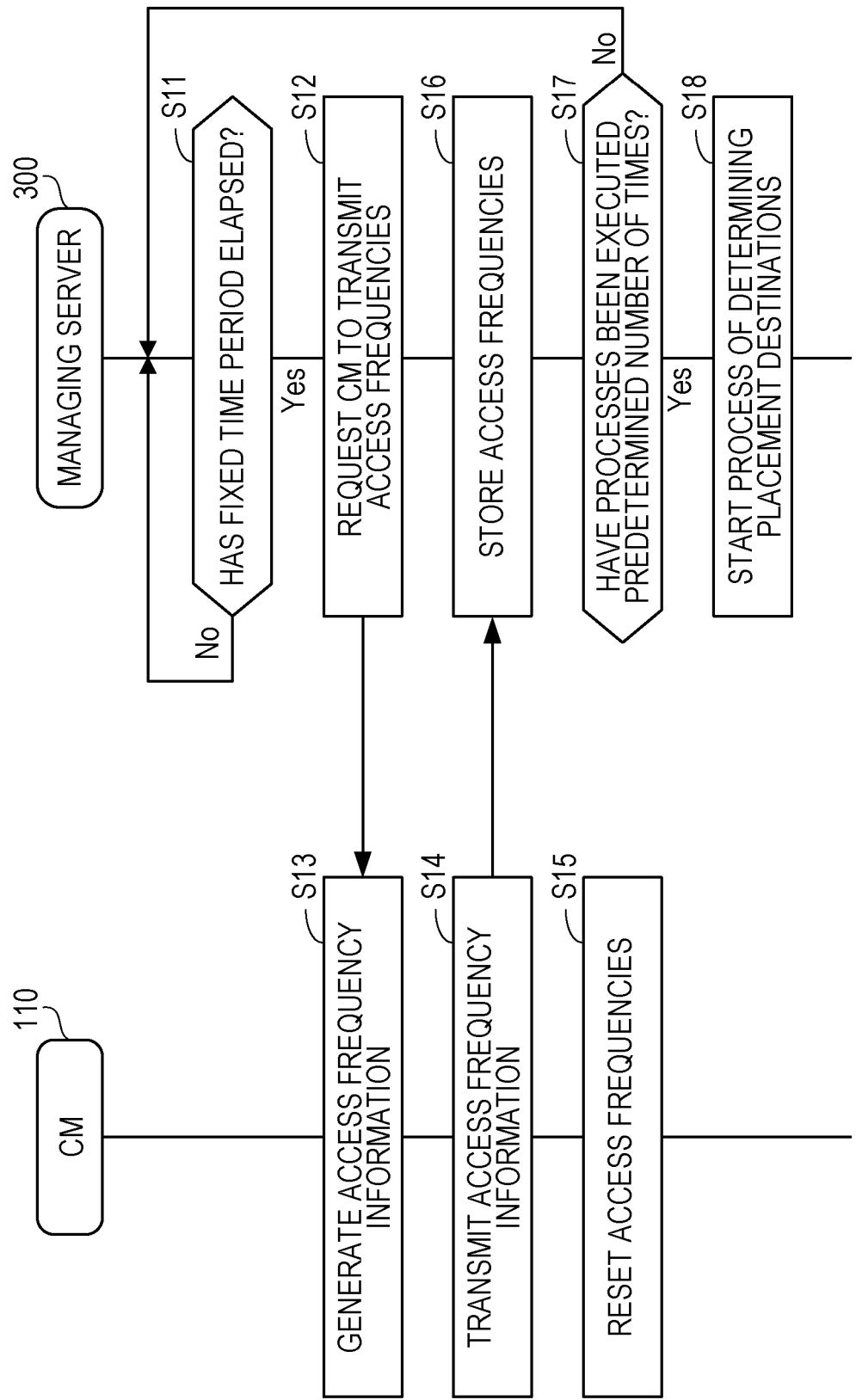
FIG. 9 is a sequence diagram illustrating an example of a procedure for a process of collecting access frequencies.

FIG. 9 is the sequence diagram illustrating a procedure for a process of collecting access frequencies. In the storage system, the process illustrated in FIG. 9 is repeatedly executed.

In an initial state immediately before the execution of the process illustrated in FIG. 9, values of access frequencies indicated in the records of the unit region management table 132 of the CM 110 are initialized to 0, and values are not registered in the access frequency item in the records of the unit region management table 311 of the managing server 300.

From the initial state, the access frequency collecting unit 321 of the managing server 300 waits until a fixed time period elapses or the access frequency collecting unit 321 waits until the end of a unit time period (in step S11). The access control unit 141 of the CM 110 executes access control in accordance with a request from the host server 200 until the fixed time period elapses. Every time access to a unit region is requested, the value of an access frequency corresponding to the unit region is incremented in the unit region management table 132.

When the fixed time period elapses, the access frequency collecting unit 321 requests the CM 110 to transmit access frequencies (in step S12). The access frequency transmitting unit 142 of the CM 110 acquires the access frequencies from the records of the unit region management table 132 and generates access frequency information in which the access frequencies of the unit regions are listed (in step S13). The access frequency transmitting unit 142 transmits the generated access frequency information to the managing server 300 (in step S14). In addition, the access frequency transmitting unit 142 resets, to 0, values of the access frequencies indicated in the records of the unit region management table 132 (in step S15).

The access frequency collecting unit 321 of the managing server 300 receives the access frequency information and causes the access frequencies included in the access frequency information to be stored in the unit region management table 311 (in step S16). In this case, the access frequency collecting unit 321 compares an access frequency, included in the access frequency information, of a certain unit region with an access frequency registered in the unit region management table 311 and corresponding to the unit region. When the former value is larger than the latter value, the access frequency collecting unit 321 updates the latter value to the former value. Thus, in the access frequency item of the unit region management table 311, the maximum values among access frequencies in the unit time periods of the entire time period for collecting access frequencies are registered.

The access frequency collecting unit 321 determines whether or not the processes of steps S12 and S16 have been executed a predetermined number of times (in step S17). When the processes of steps S12 and S16 have not been executed the predetermined number of times, the access frequency collecting unit 321 waits until a fixed time period elapses (in step S11). When the fixed time period elapses, the process proceeds to the process of step S12. When the processes of steps S12 and S16 have been executed the predetermined number of times, or when the time period for collecting the access frequencies ends, the access frequency collecting unit 321 starts a process of determining placement destinations of data of the unit regions (in step S18).

Figure 10:
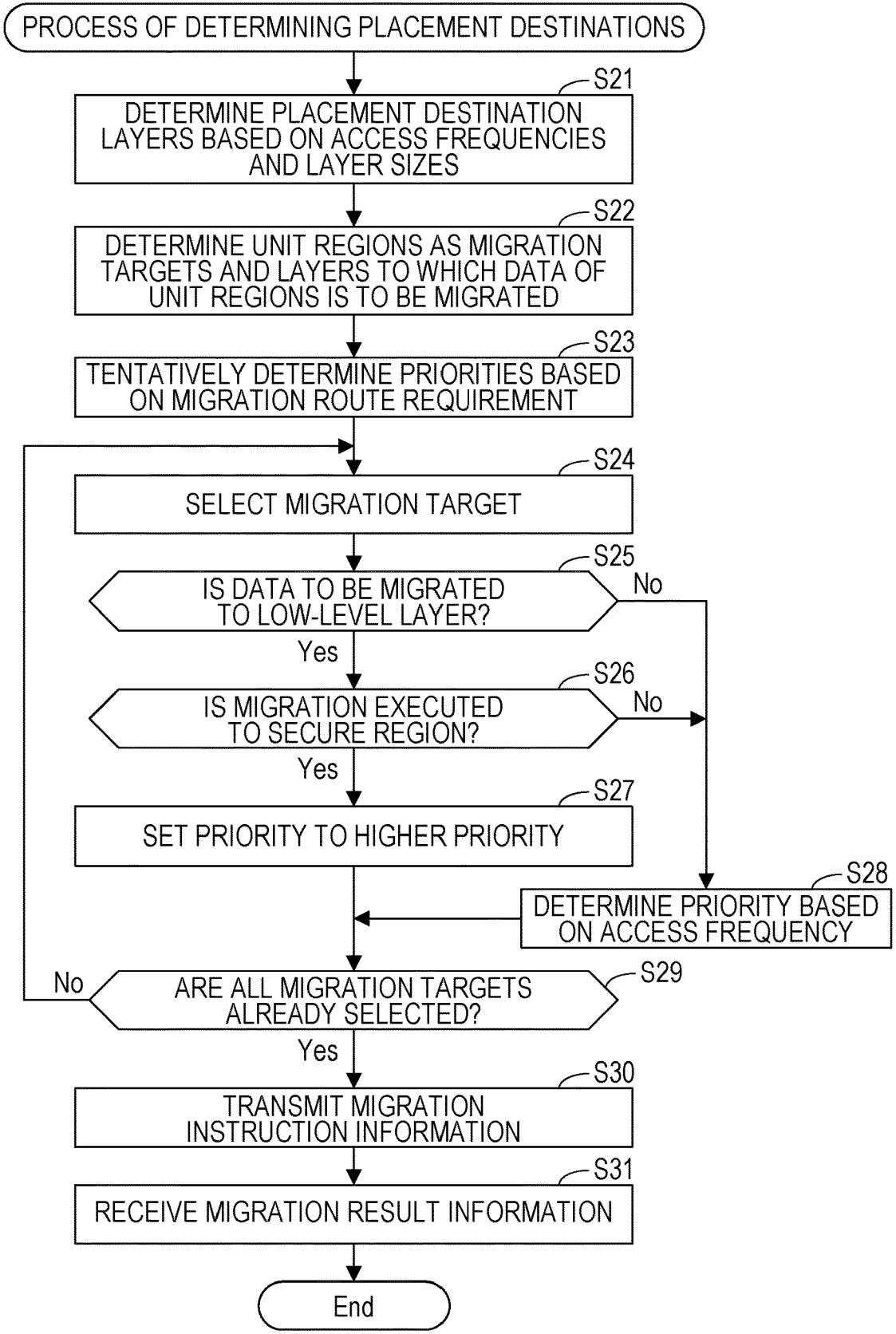
FIG. 10 is a flowchart of an example of a procedure for a process of determining placement destinations of data.

FIG. 10 is an example of a flowchart of the process of determining placement destinations of data.

In step S21, the placement destination determining unit 322 of the managing server 300 determines placement destination layers of the data of the unit regions. For example, the placement destination determining unit 322 classifies the unit regions for each of the tier pools that are the placement destination layers of the data, and executes the following process on each of groups of the classified unit regions.

The placement destination determining unit 322 acquires access frequencies of the unit regions from the unit region management table 311 and determines the placement destination layers of the data of the unit regions based on the acquired access frequencies. For example, when a certain tier pool has two layers, a threshold TH is set. Then, placement destination layers are determined so that data of a unit region whose access frequency is lower than the threshold TH is placed in a low-level layer and that data of a unit region whose access frequency is equal to or higher than the threshold TH is placed in a high-level layer. When a certain tier pool has three layers, two thresholds TH1 and TH2 (TH1<TH2) are set. Then, placement destination layers are determined so that data of a unit region whose access frequency is lower than the threshold TH1 is placed in a low-level layer, data of a unit region whose access frequency is equal to or higher than the threshold TH1 and lower than the threshold TH2 is placed in a middle-level layer, and data of a unit region whose access frequency is equal to or higher than the threshold TH2 is placed in a high-level layer.

In the aforementioned determination method using the thresholds, the total size of data of unit regions for which a certain layer has been determined as an placement destination layer may exceed the size of the certain layer. In this case, the placement determination determining unit 322 selects unit regions in descending order of access frequency from among the unit regions for which the certain layer has been determined as the placement destination layer so that the total data size is equal to or smaller than the size of the certain layer. Then, the placement determination determining unit 322 sets a placement destination layer of the selected unit regions to the certain layer. In addition, the placement destination determining unit 322 changes a placement destination layer of the remaining unit regions to a layer whose level is lower by one level than the certain layer. When a certain tier pool has three layers or more, the placement destination determining unit 322 sequentially executes the aforementioned process on the tier pool in order from the highest-level layer.

In step S22, the placement destination determining unit 322 determines, as migration targets, unit regions of which data is to be migrated between layers. For example, the placement destination determining unit 322 determines, as the migration targets, unit regions for which currently set layers are different from the placement destination layers determined in step S21. In addition, the placement destina- tion determining unit 322 determines, as migration destination layers, the placement destination layers determined in step S21 for the unit regions determined as the migration targets.

In addition, the placement destination determining unit 322 extracts, from the unit regions determined as the migration targets, unit regions of which data is to be migrated to lower-level layers. Then, the placement destination determining unit 322 identifies, from the extracted unit regions, unit regions of which data is to be migrated to secure regions of higher-level layers. In this case, the placement destination determining unit 322 identifies, as the unit regions, unit regions storing data to be migrated to destination layers whose levels are lower than the placement destination layers determined in step S21. For example, the unit regions are identified as follows, for example.

When a certain tier pool has two layers, a unit region of which data is to be migrated from a high-level layer to a low-level layer and whose access frequency is equal to or higher than the threshold TH is identified as a unit region on which region securement migration is to be executed. When a certain tier pool has three layers, a unit region of which data is to be migrated from a high-level layer to a middle-level layer and whose access frequency is equal to or higher than the threshold TH2 is identified as a unit region on which region securement migration is to be executed. In addition, a unit region of which data is to be migrated from the middle-level layer to a low-level layer and whose access frequency is equal to or higher than the threshold TH1 is identified as a unit region on which region securement migration is to be executed.

In step S23, the placement destination determining unit 322 references the priority setting table 313 and tentatively determines priorities for the unit regions determined as the migration targets, based on the migration route requirement indicating layers from which data is to be migrated and layers to which the data is to be migrated. For example, when a certain tier pool has three layers, the placement destination determining unit 322 classifies each of unit regions into any of the migration types C3 and C5 to C7 (refer to FIG. 8), based on the migration route requirement. The placement destination determining unit 322 tentatively determines, as a priority for each of the unit regions, any (for example, a value indicating the highest priority) of priorities set for the classified migration types in the priority setting table 313.

In step S24, the placement destination determining unit 322 selects one of the unit regions determined as the migration targets.

In step S25, the placement destination determining unit 322 determines whether or not data of the selected unit region is to be migrated to a lower-level layer. When the data is to be migrated to the lower-level layer, the placement destination determining unit 322 executes a process of step S26. When the data is not to be migrated to the lower-level layer, the placement destination determining unit 322 executes a process of step S28.

In step S26, the placement destination determining unit 322 determines whether or not the data of the selected unit region is to be migrated to secure a region of a higher-level layer. When the data of the selected unit region is migrated to secure the region of the higher-level layer, the placement destination determining unit 322 executes a process of step S27. When the data of the selected unit region is not migrated to secure the region of the higher-level layer, the placement destination determining unit 322 executes a process of step S28.

In step S27, the placement destination determining unit 322 changes the value of a priority corresponding to the selected unit region to a higher priority based on the priority setting table 313. For example, when a certain tier pool has three layers, a priority set for a unit region of which data is to be migrated from a middle-level layer to a low-level layer to secure a region of a high-level layer is changed to "1", a priority set for a unit region of which data is to be migrated from the high-level layer to the middle-level layer is changed to "2", and a priority set for a unit region of which data is to be migrated from the middle-level layer to the low-level layer to secure a region of the middle-level layer is changed to "7".

In step S28, the placement destination determining unit 322 references the priority setting table 313 and finally determines a priority, based on the access frequency of the unit region. For example, the placement destination determining unit 322 determines the priority for the unit region by comparing an access frequency range set for a migration type into which the unit region has been classified in step S23 with the access frequency of the unit region.

In any of the processes of steps S27 and S28, the priority for the unit region selected as the migration target in step S24 is formally determined.

In step S29, the placement destination determining unit 322 determines whether or not all unit regions as migration targets are already selected. When an unselected unit region exists, the placement destination determining unit 322 causes the process to proceed to step S24. When all the unit regions are already selected, the placement destination determining unit 322 executes a process of step S30.

In step S30, the placement destination determining unit 322 generates migration instruction information. The migration instruction information includes, for each of the unit regions as the migration targets, information identifying the unit region, information identifying a layer of a data migration destination or a subpool, and a determined priority. The placement destination determining unit 322 transmits the generated migration instruction information to the CM 110.

In step S31, the placement destination determining unit 322 receives migration result information every time the CM 110 migrates data of a unit region as a migration target. The migration result information includes information identifying the unit region and information identifying a layer of a data migration destination or a subpool. The placement destination determining unit 322 updates a record included in the unit region management table 311 and corresponding to the unit region of which the data has been migrated.

Figure 11:
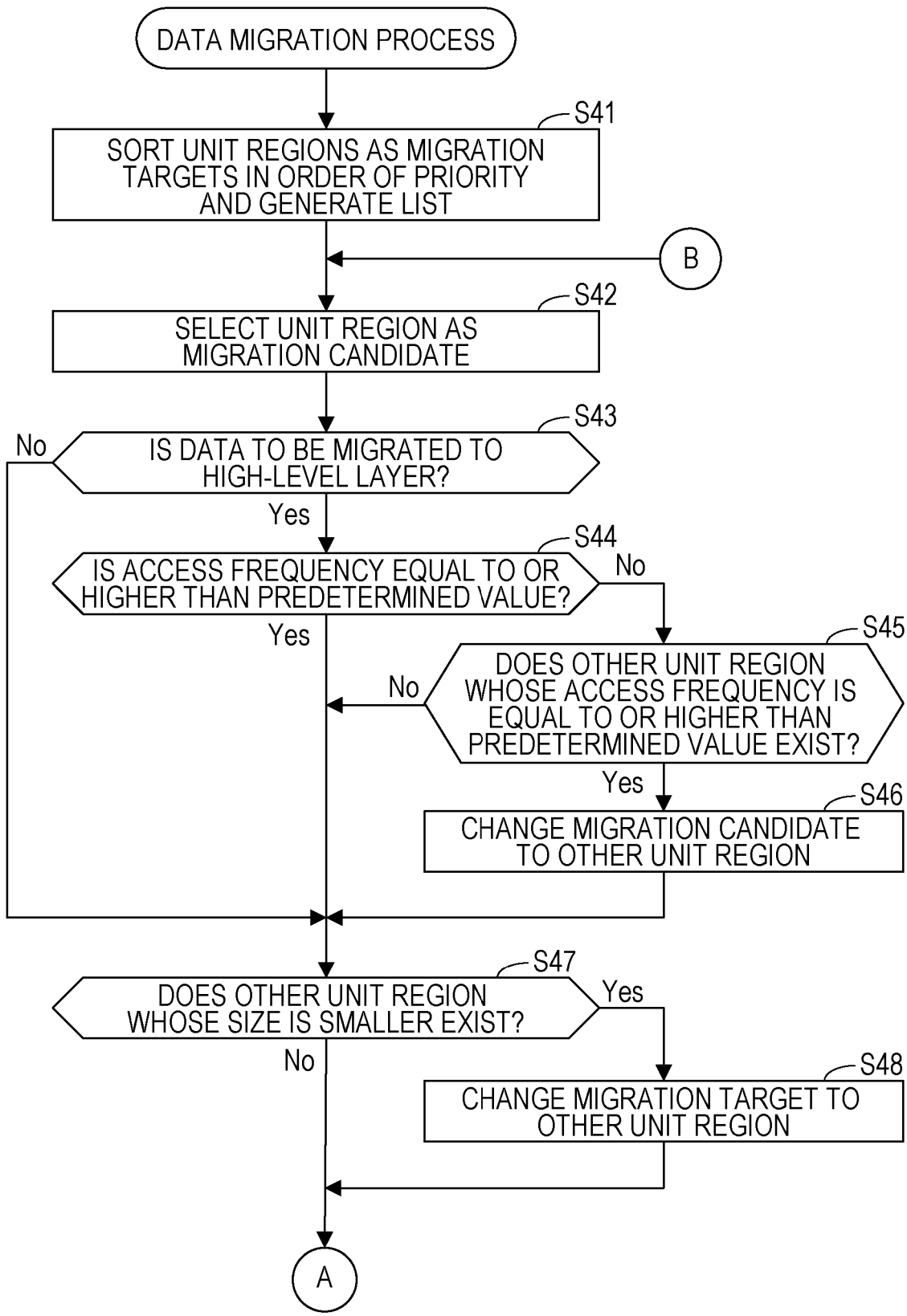
FIG. 11 is a first flowchart of an example of a procedure for a process of migrating data.
Figure 12:
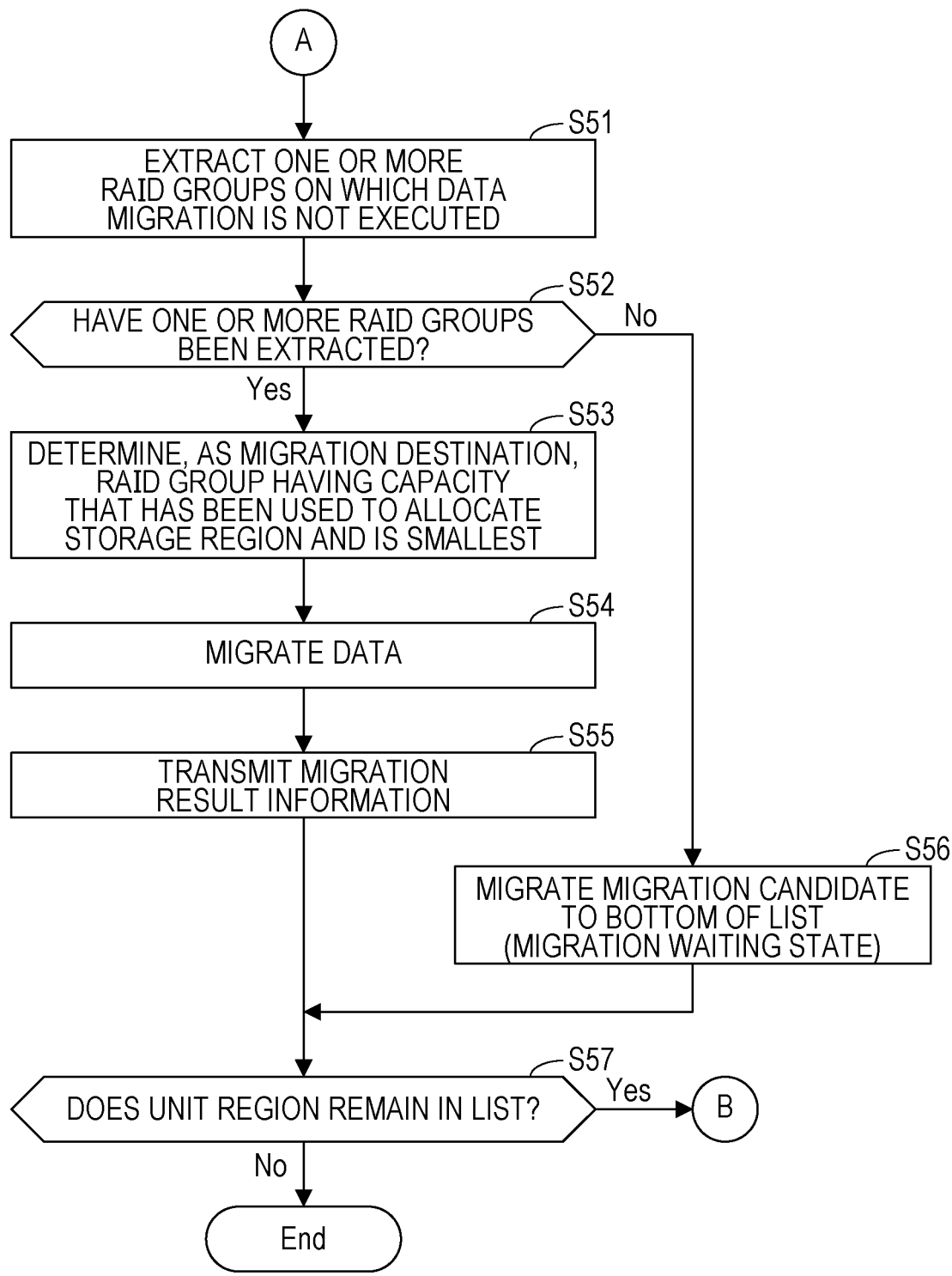
FIG. 12 is a second flowchart of the example of the procedure for the process of migrating data.

FIGS. 11 and 12 are an example of a flowchart illustrating a procedure for the process of migrating data. When the migration processing unit 143 of the CM 110 receives the migration instruction information transmitted in step S30 illustrated in FIG. 10, the process illustrated in FIG. 11 is started.

In step S41, the migration processing unit 143 generates a migration target list by sorting the unit regions, indicated in the received migration instruction information and serving as the migration targets, in order from the highest priority to the lowest priority.

In step S42, the migration processing unit 143 selects the top unit region as a migration candidate from the migration target list.

In step S43, the migration processing unit 143 determines whether or not data of the selected unit region is to be migrated to a higher-level layer. When the data is to be migrated to the higher-level layer, the migration processing unit 143 executes a process of step S44. When the data is not to be migrated to the higher-level layer, the migration processing unit 143 executes a process of step S47.

In step S44, the migration processing unit 143 references the unit region management table 132 and acquires an access frequency currently registered in a record included in the unit region management table 132 and corresponding to the selected unit region. The migration processing unit 143 determines whether or not the acquired access frequency is equal to or higher than a predetermined value TH3. When the acquired access frequency is equal to or higher than the predetermined value TH3, the migration processing unit 143 executes a process of step S47. When the acquired access frequency is lower than the predetermined value TH3, the migration processing unit 143 executes a process of step S45.

In step S45, the migration processing unit 143 identifies, from the migration target list, one or more other unit regions for which the same priority as that set for the unit region selected as the migration candidate has been set. The migration processing unit 143 references the unit region management table 132 and acquires access frequencies currently registered in records included in the unit region management table 132 and corresponding to the identified one or more other unit regions. The migration processing unit 143 determines whether or not a unit region whose access frequency is equal to or higher than the predetermined value TH3 exists among the identified one or more other unit regions. When the unit region whose access frequency is equal to or higher than the predetermined value TH3 exists, the migration processing unit 143 executes a process of step S46. When the unit region whose access frequency is equal to or higher than the predetermined value TH3 does not exist, the migration processing unit 143 executes a process of step S47.

In step S46, the migration processing unit 143 changes the migration candidate to the other unit region whose access frequency has been determined to be equal to or higher than the predetermined value TH3 in step S45. When the multiple other unit regions exists, a unit region whose access frequency is the highest among the other unit regions is selected. The unit regions before the change remain in the migration target list.

In step S47, the migration processing unit 143 identifies, from the migration target list, one or more other unit regions for which the same priority as that set for the unit region selected as the migration candidate has been set. The migration processing unit 143 determines whether or not a unit region whose size is smaller than the unit region selected as the migration candidate exists among the identified one or more other unit regions. When the other unit region whose size is smaller exists, the migration processing unit 143 executes a process of step S48. When the other unit region whose size is smaller does not exist, the migration processing unit 143 executes a process of step S51 illustrated in FIG. 12.

In step S48, the migration processing unit 143 changes the migration candidate to the other unit region whose size has been determined to be smaller in step S47. When multiple other unit regions whose sizes are smaller than the unit region selected as the migration candidate exist among the identified other unit regions, the smallest unit region is selected, for example. The unit regions before the change remain in the migration target list. After that, the process of step S51 illustrated in FIG. 12 is executed.

The process is continuously described below with reference to FIG. 12.

In step S51, the migration processing unit 143 determines a subpool of a migration destination of the data of the unit region selected as the migration candidate. The migration processing unit 143 references the pool management table 133 and identifies RAID groups set in the determined subpool. The migration processing unit 143 extracts, from the identified RAID groups, one or more RAID groups on which the migration of data of the one or more other unit regions is not being executed between layers.

In step S52, when the one or more RAID groups on which the migration of the data is not being executed are extracted in step S51, the migration processing unit 143 causes the process to proceed to step S53. In step S52, when the one or more RAID groups are not extracted in step S51, the migration processing unit 143 causes the process to proceed to step S56.

In step S53, the migration processing unit 143 selects, from among the extracted one or more RAID groups, a RAID group having a capacity that has been used to allocate a storage region to a unit region and is the smallest among capacities used to allocate a storage region and included in the extracted one or more RAID groups, and the migration processing unit 143 determines the selected RAID group as a data migration destination.

In step S54, the migration processing unit 143 migrates the data of the unit region selected as the migration candidate to the RAID group determined as the migration destination in step S53.

In step S55, the migration processing unit 143 transmits migration result information indicating the detail of the data migration executed in step S54 to the managing server 300. In addition, the migration processing unit 143 deletes, from the migration target list, the unit region of which the migration of the data has been completed.

In step S56, the migration processing unit 143 migrates the unit region selected as the migration target to the bottom of the migration target list. Thus, the unit region is set to a migration waiting state.

In step S57, the migration processing unit 143 determines whether or not a unit region of which data is not migrated remains in the migration target list. When the unit region remains, the migration processing unit 143 causes the process to proceed to step S42 and selects a next unit region as the migration target. On the other hand, when the unit region does not remain, the migration processing unit 143 terminates the process.

In the process illustrated in FIGS. 11 and 12, when a RAID group to which data is not migrated is exists among the RAID groups set in the subpool that is the data migration destination, the data is migrated to the RAID group in step S54. Thus, the aforementioned data migration control (1) is enabled.

When data migration is being executed on all the RAID groups set in the subpool that is the data migration destination, the migration of the data of the unit region as the migration target is set to be executed later in step S56. After that, the process of step S42 is executed to select a next unit region as the migration target. Thus, the aforementioned data migration control (2) is enabled.

When a certain unit region whose access frequency is very high exists among other unit regions for which the same priority has been set, the migration target is changed to the certain unit region in step S46, and data of the certain unit region is migrated on a priority basis. Thus, the aforementioned data migration control (3) is enabled.

When a certain unit region whose size is smaller than the unit region as the migration target exists among other the unit regions for which the same priority has been set, the migration target is changed to the certain unit region in step S48, and data of the certain unit region is migrated on a priority basis. Thus, the aforementioned data migration control (4) is enabled.

The processing functions of the devices (data processing device 1, CM 110, host server 200, and managing server 300) described in the embodiments may be enabled by a computer. In this case, the processing functions are enabled in the computer by causing the computer to execute a program in which details of the processes of the functions of the devices are described. The program in which the details of the processes are described may be recorded in a computer-readable recording medium. Examples of the computer-readable recording medium are a magnetic storage device, an optical disc, a magneto-optical recording medium, and a semiconductor memory. Examples of the magnetic storage device are a hard disk device (HDD), a flexible disk (FD), and a magnetic tape. Examples of the optical disc are a compact disc (CD), a digital versatile disc (DVD), and a Blu-ray disc (BD). An example of the magneto-optical recording medium is a magneto-optical (MO) disk.

When the program is distributed, a portable recording medium storing the program is marketed. The portable storage medium is a DVD, a CD, or the like. In addition, the program may be stored in a storage device of a server computer and transferred from the server computer to another computer via a network.

The computer configured to execute the program stores, in the storage device of the computer, the program recorded in the portable recording medium or transferred from the server computer. The computer reads the program from the storage device of the computer and executes the processes in accordance with the program. The computer may read the program directly from the portable recording medium and execute the processes in accordance with the program. In addition, every time the program is transferred from the server computer connected via the network to the computer, the computer may execute the processes in accordance with the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing device comprising:
a memory configured to store configuration information indicating a configuration of a plurality of physical storage regions that are respectively formed by storage devices having different levels of access performances; and
a processor coupled to the memory and configured to:
in a state where one of the plurality of physical storage regions is allocated to each of a plurality of unit regions included in a logical storage region, based on the configuration information, identify, from among the plurality of unit regions, multiple first unit regions which have been allocated from physical storage regions whose allocations to the first unit regions are to be changed, and execute a migration control process including:
sequentially selecting, from among the multiple first unit regions, a second unit region as a candidate for data migration, and
instructing data migration of the second unit region between the plurality of physical storage regions, wherein
the migration control process includes:
when the second unit region is selected as a candidate for data migration from among the multiple first unit regions, determining whether data migration of any one of the plurality of unit regions whose data has been instructed to be migrated is being executed on each of multiple divided regions obtained by dividing a physical storage region to which data of the second unit region is to be migrated, and
controlling, based on a result of the determining, an instruction process of instructing data migration of the second unit region.

2. The data processing device of claim 1, wherein
in the controlling the instruction process, when the multiple divided regions includes a certain divided region on which data migration of any one of the plurality of unit regions whose data has been instructed to be migrated is not being executed, data of the second unit region is instructed to be migrated to the certain divided region.

3. The data processing device of claim 1, wherein
in the controlling the instruction process, when data migration of one of the plurality of unit regions whose data has been instructed to be migrated is being executed on each of the multiple divided regions, data migration of the second unit region is set to an instruction waiting state, and a third unit region is selected from among the multiple first unit regions as a candidate for data migration.

4. The data processing device of claim 1, wherein:
an execution priority of data migration is set for each of the multiple first unit regions;
the second unit region is selected from among the multiple first unit regions in order from a higher execution priority to a lower execution priority; and
the migration control process further includes:
when a latest access frequency of the second unit region is lower than a predetermined value, identifying, from among the multiple first unit regions, third unit regions whose execution priorities are same as an execution priority set for the second unit region and whose data are not instructed to be migrated, and
when the third unit regions include a fourth unit region whose latest access frequency is equal to or higher than a predetermined value, instructing data migration of the fourth unit region before data migration of the second unit region.

5. The data processing device of claim 4, wherein:
a source physical storage region from which data of the multiple first unit regions is to be migrated and a destination physical storage region to which data of the multiple first unit regions is to be migrated are determined based on respective access frequencies measured in a time period before the multiple unit regions are identified from among the plurality of unit regions; and the latest access frequencies of the second unit region and the third unit regions are measured in a time period after the first unit regions are identified from among the plurality of unit regions.

6. The data processing device of claim 1, wherein:
multiple storage sets each including a plurality of physical storage regions are provided;
a plurality of logical storage regions having different unit region sizes are provided so that each logical storage region includes a plurality of unit regions to which one of the plurality of physical storage regions is allocated;
a plurality of migration control processes are provided and each executed by using the multiple storage sets and different one of the plurality of logical storage regions;
the multiple first unit regions are identified from among the plurality of logical storage regions each including the plurality of unit regions;
an execution priority of data migration is set for each of the multiple first unit regions, and the second unit region as a candidate for data migration is sequentially selected from among the multiple first unit regions in order from a highest execution priority; and
the migration control process includes:
when the multiple first unit regions includes a third unit region whose execution priority is same as an execution priority set for the second unit region and whose unit region size is smaller than a unit region size of the second unit region, instructing data migration of the third unit region before data migration of the second unit region.

7. A data processing system comprising:
a plurality of memories in which a plurality of physical storage regions are formed using memories having different levels of access performances among the plurality of memories; and
a data processing device including a processor configured to:
in a state where one of the plurality of physical storage regions is allocated to each of a plurality of unit regions included in a logical storage region, identify, from among the plurality of unit regions, multiple first unit regions which have been allocated from physical storage regions whose allocations to the first unit regions are to be changed, and execute a migration control process including:
sequentially selecting, from among the multiple first unit regions, a second unit region as a candidate for data migration, and
instructing data migration of the second unit region between the plurality of physical storage regions, wherein
the migration control process includes:
when the second unit region is selected as a candidate for data migration from among the multiple first unit regions, determining whether data migration of any one of the plurality of unit regions whose data has been instructed to be migrated is being executed on each of multiple divided regions obtained by dividing a physical storage region to which data of the second unit region is to be migrated, and
controlling, based on a result of the determining, an instruction process of instructing data migration of the second unit region.

8. A non-transitory, computer-readable recording medium having stored therein a program for causing a computer to execute a process comprising:
providing a plurality of physical storage regions that are respectively formed by storage devices having different levels of access performances;
in a state where one of the plurality of physical storage regions is allocated to each of a plurality of unit regions included in a logical storage region, identifying, from among the plurality of unit regions, multiple first unit regions which have been allocated from physical storage regions whose allocations to the first unit regions are to be changed; and
executing a migration control process including:
sequentially selecting, from among the multiple first unit regions, a second unit region as a candidate for data migration, and
instructing data migration of the second unit region between the plurality of physical storage regions, wherein
the migration control process includes:
when the second unit region is selected as a candidate for data migration from among the multiple first unit regions, determining whether data migration of any one of the plurality of unit regions whose data has been instructed to be migrated is being executed on each of multiple divided regions obtained by dividing a physical storage region to which data of the second unit region is to be migrated, and
controlling, based on a result of the determining, an instruction process of instructing data migration of the second unit region.

\* \* \* \* \*